United States Patent [19]

Itoi et al.

[11] Patent Number: 5,178,950
[45] Date of Patent: Jan. 12, 1993

[54] PROCESS FOR PRODUCING CATIONIC DYE-DYEABLE POLYESTER FIBER WITH HIGH STRENGTH AND POLYESTER RESIN COMPOSITION USED THEREFOR

[75] Inventors: Akito Itoi; Isao Nishi; Yasuo Ishii; Toshio Sato, all of Wakayama, Japan

[73] Assignee: Kao Corporation, Tokyo, Japan

[21] Appl. No.: 851,170

[22] Filed: Mar. 13, 1992

[30] Foreign Application Priority Data

Mar. 14, 1991 [JP] Japan .................................. 3-49793
Mar. 14, 1991 [JP] Japan .................................. 3-49794

[51] Int. Cl.$^5$ ............................................. D02G 3/00
[52] U.S. Cl. ..................... 428/364; 528/176; 528/194; 528/272; 528/288; 528/293; 528/294; 528/295; 528/298; 528/300; 528/302; 528/308; 528/308.6; 528/322; 525/437
[58] Field of Search ............... 528/272, 288, 293, 294, 528/295, 298, 300, 302, 308, 308.6, 322, 176, 194; 525/437; 428/364

[56] References Cited

U.S. PATENT DOCUMENTS

| | | | |
|---|---|---|---|
| 3,901,853 | 8/1975 | Tanikella | 528/289 |
| 3,962,194 | 6/1976 | Bollert et al. | 528/287 |
| 4,233,355 | 11/1980 | Sato et al. | 428/224 |
| 4,330,588 | 5/1982 | Larson et al. | 428/264 |
| 4,377,682 | 3/1983 | Ohguchi et al. | 528/301 |
| 4,427,557 | 1/1984 | Stockburger | 252/8.7 |
| 4,483,976 | 11/1984 | Yamamoto et al. | 528/295 |
| 4,526,738 | 7/1985 | Miyoshi et al. | 264/176 |
| 4,611,049 | 9/1986 | Kuratsuji et al. | 528/279 |
| 4,622,381 | 11/1986 | Suzuki et al. | 528/295 |
| 4,742,151 | 5/1988 | Tate et al. | 528/272 |
| 4,851,504 | 7/1989 | Suzuki et al. | 528/287 |
| 4,910,292 | 3/1990 | Blount | 528/272 |
| 4,978,740 | 12/1990 | Kawamoto et al. | 528/272 |
| 5,070,178 | 12/1991 | Yamada | 528/272 |

Primary Examiner—John Kight, III
Assistant Examiner—Sam A. Acquah
Attorney, Agent, or Firm—Sughrue, Mion, Zinn, Macpeak & Seas

[57] ABSTRACT

A cationic dye-dyeable polyester resin composition comprising a cationic dye-dyeable polyester resin and a melt viscosity depressant.

Addition of the melt viscosity depressant to the cationic dye-dyeable polyester resin reduces the melt viscosity of the resin without decreasing the intrinsic viscosity thereby making the resin melt-spinnable. A cationic dye-dyeable polyester fiber with high strength can be obtained from the polyester resin composition.

4 Claims, No Drawings

PROCESS FOR PRODUCING CATIONIC DYE-DYEABLE POLYESTER FIBER WITH HIGH STRENGTH AND POLYESTER RESIN COMPOSITION USED THEREFOR

FIELD OF THE INVENTION

The present invention relates to a polyester resin composition dyeable with a cationic dye and to a process for producing a polyester fiber therefrom. More particularly, it relates to a cationic dye-dyeable polyester resin composition having high strength and satisfactory dyeability which is obtained by adding a melt viscosity depressant to a polyester resin and to a process for producing a polyester fiber by melt spinning such a polyester resin composition.

BACKGROUND OF THE INVENTION

Polyester resins are widely used on account of their various excellent characteristics. However, they have low dyeability and can hardly be dyed except with disperse dyes. Among various proposals to improve the dyeability of polyester resins, one is copolymerization of an isophthalic acid component containing a sulfonic acid salt with a resin to endow the polyester with dyeability with cationic dyes, as disclosed, e.g., in JP-B-34-10497 (the term "JP-B" as used herein means an "examined published Japanese patent application").

However, such a polymerization system has considerably increased a melt viscosity of resins due to the thickening effect of the sulfonate-containing isophthalic acid component and thus has low moldability because of an increase in spinning pressure and a reduction in spinnability. Therefore, thus obtained polyester fibers tend to be deteriorated in strength due to a decreased polymerization degree and have found limited use and have not been useful alone in sportswear, paraglider wings, sails of yachts, suits, etc.

Increasing the melting point is one approach to reduce melt viscosity but increasing the melting point accelerates resin degradation. As a result, the degree of polymerization is decreased, so that one fails to obtain a cationic dye-dyeable polyester fiber having a high polymerization degree and high strength. In order to overcome these problems, the addition of a lubricant has been suggested. However, the addition of ethylenebisstearamide, stearic acid or stearyl alcohol as a lubricant to a resin compound decreases the melt viscosity and also decreases the degree of polymerization of the resin.

On the other hand, it has been proposed to add melt viscosity depressants to polyester resins, to thereby obtain high strength polyester fibers, e.g., in WO91/02111. However, cationic dye-dyeable polyester resins are specific polymers having a very high viscosity as compared with the resins to which the melt viscosity depressant has been added conventionally.

Under such a circumstance, the development of cationic dye-dyeable polyester resin has been desired in which the melt viscosity is reduced while cationic dye-dyeability is maintained.

SUMMARY OF THE INVENTION

It has now been found that the addition of specific melt viscosity depressants to a cationic dye-dyeable polyester resin provides a polyester resin composition having a greatly reduced melt viscosity without decreasing the degree of polymerization of the resin, which polyester resin composition thereby exhibits markedly improved moldability and spinnability. That is, it has been found that a polymer resin can be made melt-spinnable while retaining a high degree of polymerization to provide cationic dye-dyeable polyester fibers having high strength.

The present invention relates to a cationic dye-dyeable polyester resin composition comprising (A) a cationic dye-dyeable polyester resin comprising a bifunctional carboxylic acid component comprising as a main component terephthalic acid, a glycol component and a sulfonic acid salt represented by formula (I):

and (B) at least one compound selected from the group consisting of a compound represented by Formula (II):

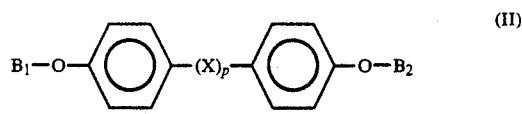

a compound represented by Formula (III):

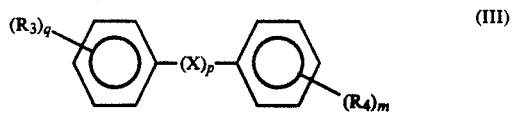

and a compound represented by Formula (IV):

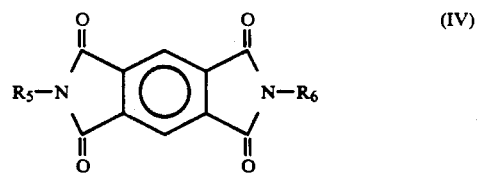

The present invention also relates to a process for producing a polyester fiber comprising spinning the above-described polyester resin composition.

DETAILED DESCRIPTION OF THE INVENTION

The cationic dye-dyeable polyester resin to be used in the present invention is a polymer obtained by copolymerising, in a conventional manner, a bifunctional carboxylic acid component comprising as a main component terephthalic acid with a glycol component and a sulfonic acid salt.

Terephthalic acid may comprise at least 80 mol % of the bifunctional carboxylic acid components. Useful bifunctional carboxylic acids other than terephthalic acid include aromatic, aliphatic or alicyclic dicarboxylic acids, e.g., isophthalic acid, naphthalenedicarboxylic acid, diphenyldicarboxylic acid, diphenoxyethanedicarboxylic acid, β-hydroxyethoxybenzoic acid, p-hydroxybenzoic acid, adipic acid, sebacic acid, and 1,4-cyclohexanedicarboxylic acid.

Alkylene glycols such as ethylene glycol, trimethylene glycols and tetramethylene glycol preferably comprises at least 80 mol% of the glycol component, in particular, ethylene glycol is more preferable among such alkylene glycols. Useful glycol compounds other than the above-mentioned alkylene glycols include aromatic, aliphatic or alicyclic diol compounds, e.g., cyclohexane-1,4-dimethanol, neopentyl glycol, bisphenol A, and bisphenol S; and polyoxyalkylene glycols.

The sulfonic acid salt to be used in the present invention is represented by Formula (I).

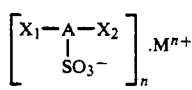
(I)

In Formula (I);

A represents an aromatic or aliphatic group, preferably an aromatic group;

$X_1$ represents an ester-forming functional group of an ether, an acid, an ester and an alcohol, and $X_2$ represents a hydrogen atom or an ester-forming functional group as defined for $X_1$, preferably an ester-forming functional group; $X_2$ may be the same as or different from $X_1$ where $X_2$ represents an ester forming functional group; The ester-forming functional group as defined for $X_1$ may include —O—CO—R', —CO—OH, —CO—OR', and —$(CH_2)_m$—OH, wherein R' represents an alkyl group having 1 to 4 carbon atoms or a phenyl group and m is an integer of from 1 to 3;

$M^{n+}$ represents an alkali metal cation such as sodium, potassium and lithium, an alkaline earth metal cation such as calcium and magnesium, or an onium such as tetrabutyl phosphonium, ethyltributyl phosphonium and benzyltributyl phosphonium, among which sodium is preferred; and n represents 1 or 2.

Specific examples of the compound of Formula (I) are sodium 5-sulfoisophthalate, sodium dimethyl 5-sulfoisophthalate, sodium di-2-hydroxyethyl 5-sulfoisophthalate, sodium di-4-hydroxybutyl sulfoisophthalate, tetrabutylphosphonium 3,5-dicarboxybenzenesulfonate, ethyltributylphosphonium 3,5-dicarboxybenzenesulfonate, and benzyltributylphosphonium 3,5-dicarboxybenzenesulfonate, among which isophthalic acid salts are preferred. These sulfonates may be used either individually or as a combination of two or more thereof. A preferred copolymerization ratio of the sulfonate of Formula (I) ranges from 0.1 to 10 mol%, preferably 1 to 5 mol%, based on the total ammount of the cationic dye-dyeable polyester.

The cationic dye-dyeable polyester resin preferably has an intrinsic viscosity [η] of from 0.4 to 0.7, and more preferably from 0.5 to 0.7, in a phenol/tetrachloroethane (60/40 by weight) solution at 25° C.

The melt viscosity depressant which is added to the cationic dye-dyeable polyester resin is selected from the compounds represented by formulae (II), (III) and/or (IV).

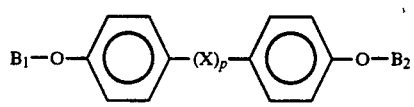
(II)

wherein $B_1$ and $B_2$ each represent an alkyl group or arylalkyl group having from 6 to 18 carbon atoms; X represents

—S—, —$SO_2$—, or —O—, wherein $R_1$ and $R_2$ each represent a hydrogen atom or an alkyl group having not more than 4 carbon atoms; and p represents 0 or 1.

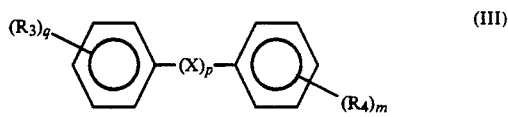
(III)

wherein X and p are as defined above; and $R_3$ and $R_4$ each represent an alkyl group; and q and m each represent 0 or an integer of from 1 to 4, with the sum of q and m ranging from 1 to 4; provided that the total carbon atom number of $(R_3)_q$ and $(R_4)_m$ (i.e., the carbon atom number of $R_3 \times q$ + the carbon atom number of $R_4 \times m$) is from 12 to 54.

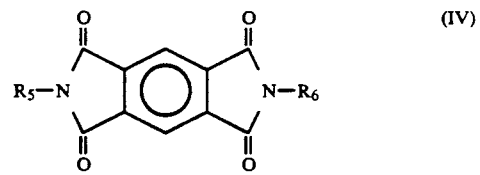
(IV)

wherein $R_5$ and $R_6$ each represents a straight-chain alkyl group having 12 to 22 carbon atoms.

In Formula (II), the carbon atom number each of $B_1$ and $B_2$ is arbitrarily selected from the range of from 6 to 18, preferably 8 to 12. If it is less than 6, the compound of Formula (II) has too low a molecular weight and is liable to boil, foam, or fume at the melting temperature of the polyester resin, causing contamination of a spinning nozzle. If it exceeds 18, compatibility with the polyester resin is deteriorated, and the compound of Formula (II) fails to exert its effect to the full.

Specific examples of the alkyl or arylalkyl group having from 6 to 18 carbon atoms as $B_1$ or $B_2$ in Formula (II) include straight chain alkyl groups, e.g., n-hexyl, n-octyl, n-decyl, n-dodecyl, n-tetradecyl, n-hexadecyl, and n-octadecyl groups; branched alkyl groups, e.g., 2-hexyldecyl and methyl-octadecyl groups; and arylalkyl groups, e.g., benzyl and 2-phenylethyl groups.

The compound of Formula (II) can easily be obtained by reacting an aromatic glycol represented by the formula:

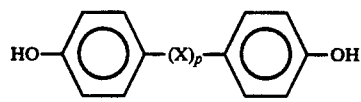

wherein p and X are as defined above, with an alkyl halide having from 6 to 18 carbon atoms and/or an arylalkyl halide having from 6 to 18 carbon atoms in the presence of an alkali catalyst, e.g., sodium hydroxide and potassium hydroxide.

Specific examples of the compound of Formula (II) are shown below:

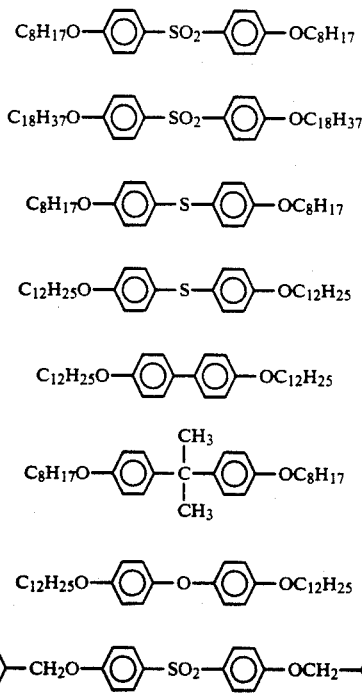

(II-1)
(II-2)
(II-3)
(II-4)
(II-5)
(II-6)
(II-7)
(II-8)

In Formula (III), the carbon atom number of each $R_3$ and $R_4$ is arbitrarily selected within such a range that the total carbon atom number of $(R_3)_q$ and $(R_4)_m$ is from 12 to 54, and preferably from 16 to 36. If the total carbon atom number is less than 12, the compound of Formula (III) has too low a molecular weight and is liable to boil, foam, or fume at the melting temperature of the polyester resin, causing contamination of a spinning nozzle. If it exceeds 54, compatibility with the polyester resin is deteriorated, and the compound of Formula (III) fails to exert its effect to the full.

Specific examples of the alkyl group as $R_3$ or $R_4$ in Formula are propyl, butyl, hexyl, octyl, decyl, dodecyl, tetradecyl, hexadecyl and octadecyl groups and a propylene tetramer residue.

The compound of Formula (III) can easily be obtained by known processes comprising, for example, reacting biphenyl, biphenyl ether, diphenyl sulfide, etc., with an α-olefin having from 9 to 18 carbon atoms in the presence of a catalyst, e.g., aluminum chloride and boron trifluoride ethyl etherate. Specific examples of the compound of Formula (III) are

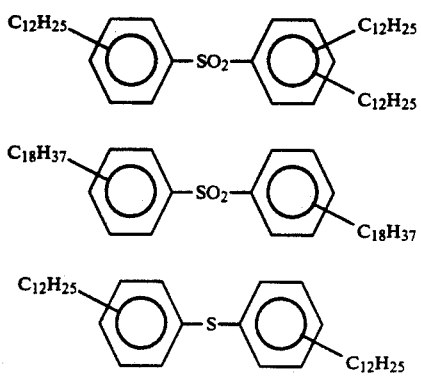

(III-1)
(III-2)
(III-3)

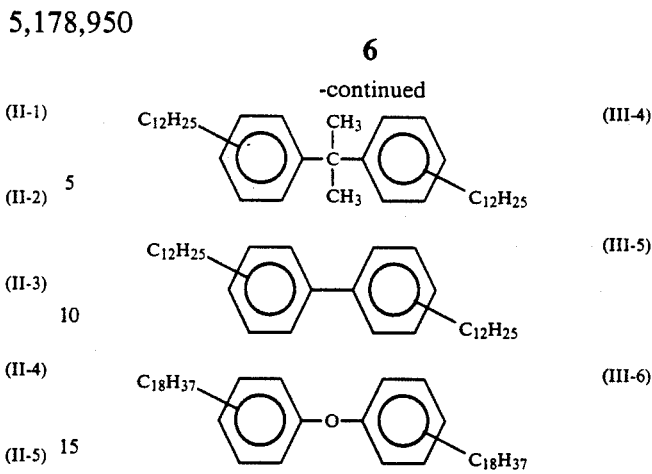

(III-4)
(III-5)
(III-6)

In Formula (IV), the carbon atom number each of $R_5$ and $R_6$ is arbitrarily selected within the range of from 12 to 22. If it is less than 12, the compound of Formula (IV) has too low a molecular weight and is liable to boil, foam, or fume at the melting temperature of the polyester resin. If it exceeds 22, compatibility with the polyester resin is deteriorated, and the copound of Formula (IV) fails to exert its effect to the full.

The compound of Formula (IV) can be easily produced by reacting 1 mol of pyromellitic anhydride with 2 mols of an amine having 12 to 22 carbon atoms to form a dicarboxylic diamide and condensing it through dehydration.

The compounds of Formulae (II), (III) and/or (IV) may be added in a total amount of from 0.5 to 10 parts by weight, preferably from 1 to 5 parts, and more preferably from 2 to 5 parts, per 100 parts by weight of the cationic dye-dyeable polyester resin. If the total amount is less than 0.5 part, desired effects are hardly achieved. If the total amount exceeds 10 parts, some adverse effects are exerted on the resin characteristics.

Addition of the compounds of Formulae (II), (III) and/or (IV) to the resin system can be carried out at any stage before the fiber preparation, i.e., either during the resin preparation or thereafter. These compounds also may be added at the spinning step to the polyester resin to be spun in the form of pellets or the molten state.

Using the cationic dye-dyeable polyester resin composition containing the compounds of Formulae (II), (III) and/or (IV), a high-strength cationic dye-dyeable polyester fiber can be obtained because of reductions in spinning pressure and tension, thereby facilitating spinning. These compounds have high heat-resistance so that they do not decompose to cause fuming or coloring even when exposed to the high temperatures of melt spinning. Thus, the addition of these compounds to the polyester resin does not cause a molecular weight reduction of the polyester resin. Furthermore, these compounds do not cause crystallization of the polyester resin, which is unfavorable in a melt spinning of polyester resins, during cooling to solidify a spun filament.

For the production of a high strength cationic dye-dyeable polyester fiber, the melt viscosity depressant of Formulae (II), (III) and/or (IV) are uniformly mixed in the cationic dye-dyeable polyester resin, and the resulting resin composition is spun in a molten state. The spun filament is then cold-stretched, followed by heat-treatment. The spun filament, after it is cooled, may be wound up and then preheated and heat-stretched followed by heat-treatment under tension. It is also possible that the spun filament can be taken up on a roller without being wound and subsequently heat-stretched and heat-treated on a heated roller.

Stretching and heat-treatment can be carried out in a conventional manner employed for general cationic dye-dyeable polyester fibers. A preferred preheating temperature for stretching is from 70° to 90° C., and a preferred heat-treatment temperature is from 150° to 190° C. For obtaining high strength, it is preferred that the stretched filament have an elongation of from 20 to 40%.

Thus obtained polyester fiber according to the present invention exhibits excellent dyeability with cationic dyes. Dyeing temperature, while subject to variation depending on the polymer composition constituting the fiber, preferably ranges from 85° to 135° C., and more preferably from 90° to 130° C.

The melt viscosity depressants to be used in the present invention make it possible to substantially reduce the melt viscosity of a cationic dye-dyeable polyester resin without a reduction in intrinsic viscosity and also facilitate spinning of a cationic dye-dyeable polyester resin composition having a high degree of polymerization to thereby obtain a high strength cationic dye-dyeable polyester fiber.

The present invention is now illustrated in greater detail with reference to Examples, but it should be understood that the present invention is not deemed to be limited thereto. All the percents, parts, and ratios are by weight unless otherwise indicated.

EXAMPLE 1

A mixture of 100 parts of dimethyl terephthalic acid and 60 parts of ethylene glycol was subjected to an ester interchanging reaction for 3 hours at a temperature of 140° to 220° C. in a nitrogen atmosphere. To the reaction product was added 2.5 mol % of sodium 3,5-dicarboxybenzen sulfonate in the state of a 20% heated solution of ethylene glycol and then the mixture was stirred at 220° C. for 30 minutes. Diantimony trioxide (0.04 part) as a catalyst was added thereto during removing excess ethylene glycol, and then the mixture was subjected to a reaction for polymerization and condensation for 3.5 hours at a temperature of 260° to 280° C. under a reduced pressure of 1 mm Hg.

The resulting polyethylene terephthalate resin was treated with dry ice and crushed. The intrinsic viscosity of the resin was measured to 0.55.

Each of the compounds shown in Table 1 below (5 parts) was added to 100 parts of the crushed polyethylene terephthalate resin. After being dried under the condition of a temperature of 140° C. and a reduced pressure of 2 mmHg for 10 hours, the resulting composition was melt-kneaded in an extruder and spun. The resulting strand was cooled with water and cut to length to prepare a test specimen.

The melt viscosity of the resin composition was measured with a flow tester under the following conditions: 260° C., a load of 10 kgf, a die diameter of 1.0 mm, a die length of 10 mm, and a plunger area of 1.0 cm². After the measurement of melt viscosity, the sample was then dissolved in a phenol/tetrachloroethane (60/40) solution, and the intrinsic viscosity [η] thereof at 25° C. was measured. Those samples having the same intrinsic viscosity as the same polyethylene terephthalate resin containing no additive were deemed to have undergone no reduction in degree of polymerization. The results obtained are shown in Table 1.

TABLE 1

| Additive | Melt Viscosity (poise) | Intrinsic Viscosity (dlg$^{-1}$) |
| --- | --- | --- |
| none | 4389 | 0.529 |
| (II-1) | 2369 | 0.528 |
| (II-2) | 2298 | 0.531 |
| (II-3) | 2273 | 0.527 |
| (II-4) | 2465 | 0.522 |
| (II-5) | 2331 | 0.530 |
| (II-6) | 2260 | 0.527 |
| (II-7) | 2281 | 0.524 |
| (II-8) | 2453 | 0.522 |
| (III-1) | 2256 | 0.520 |
| (III-2) | 2342 | 0.531 |
| (III-3) | 2293 | 0.533 |
| (III-4) | 2199 | 0.522 |
| (III-5) | 2409 | 0.535 |
| (III-6) | 2560 | 0.529 |

EXAMPLE 2

A polyethylene terephthalate resin having an intrinsic viscosity of 0.68 was prepared in the same manner as in Example 1 expect that the polymerization and condensation reaction was carried out for 5 hours.

To 100 parts of the crushed polyethylene terephthalate resin was added 5 parts of Compound (II-1), and then the mixture was dried under the condition of a temperature of 140° C. and a reduced pressure of 2 mmHg for 10 hours. The resulting resin composition was put in an extruder type melt-spinning machine and extruded through a spinning nozzle having a diameter of 0.5 mm at 280° C. at a spinning rate of 3 g/min. The spun strand was wound at a position 2.5 m below the nozzle at a rate of 1,000 m/min. The wound unstretched strand was stretched and heat-treated by means of a feed roller set at 80° C. and a plate heater set at 180° C. at a stretching ratio such that the resulting stretched yarn had an elongation of 30%.

The spinning pressure at the nozzle was 116 kgf/cm², the unstretched strand was found to have an intrinsic viscosity of 0.59, and the stretched yarn had a strength of 5.3 g/d.

EXAMPLE 3

Polyethylene fiber was produced in the same manner as in Example 2, except for replacing Compound (II-1) with Compound (II-3). As a result, the spinning pressure at the nozzle was 118 kgf/cm², the unstretched filament had an intrinsic viscosity of 0.59, and the stretched filament had a strength of 5.3 g/d.

EXAMPLE 4

Polyethylene fiber was produced in the same manner as in Example 2, except for replacing Compound (II-1) with Compound (II-7). As a result, the spinning pressure at the nozzle was 119 kgf/cm², the unstretched filament had an intrinsic viscosity of 0.59, and the stretched filament had a strength of 5.2 g/d.

COMPARATIVE EXAMPLE 1

Polyester fiber was produced in the same manner as in Example 2, except for using a cationic dye-dyeable polyethylene terephthalate containing 2.5 mol% of sodium 5-sulfoisophthalate and having an intrinsic viscosity of 0.55 and containing no melt viscosity depressant. As a result, the spinning pressure at the nozzle was 127 kgf/cm², the unstretched filament had an intrinsic viscosity of 0.51, and the stretched filament had a strength of 4.0 g/d.

COMPARATIVE EXAMPLE 2

Polyester fiber was produced in the same manner as in Example 2, except for using no melt viscosity depressant. As a result, the pressure at the spinning nozzle reached 172 kgf/cm², and breaking occurred due to poor spinnability.

EXAMPLE 5

Polyester fiber was produced in the same manner as in Example 2, except for changing the amount of the melt viscosity depressant (II-1) to 1.0 part. As a result, the pressure at the spinning nozzle was 154 kgf/cm², the unstretched filament had an intrinsic viscosity of 0.58, and the stretched filament had a fiber strength of 4.9 g/d.

EXAMPLE 6

Polyester fiber was produced in the same manner as in Example 2, except for changing the amount of the melt viscosity depressant (II-1) to 2.0 parts. As a result, the pressure at the spinning nozzle was 143 kgf/cm², the unstretched filament had an intrinsic viscosity of 0.58, and the stretched filament had a fiber strength of 5.0 g/d.

EXAMPLE 7

Polyester fiber was produced in the same manner as in Example 2, except for changing the amount of the melt viscosity depressant (II-1) to 10.0 parts. As a result, the pressure at the spinning nozzle was decreased to 105 kgf/cm², while the unstretched filament had an intrinsic viscosity of 0.59, and the stretched filament had a fiber strength of 4.6 g/d.

COMPARATIVE EXAMPLE 3

Polyester fiber was produced in the same manner as in Example 2, except for replacing the melt viscosity depressant (II-1) with 5 parts of a compound of the formula:

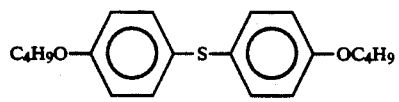

As a result, the pressure at the spinning nozzle was 136 kgf/cm², and fuming was observed in the vicinity of the spinning nozzle. The unstretched filament was colored a little. The unstretched filament had an intrinsic viscosity of 0.54, and the stretched filament had a strength of 3.8 g/d, indicating significant reductions in resin molecular weight and fiber strength as compared with the present invention.

COMPARATIVE EXAMPLE 4

Polyester fiber was produced in the same manner as in Example 2, except for replacing the melt viscosity depressant (II-1) with 5 parts of a compound of the formula:

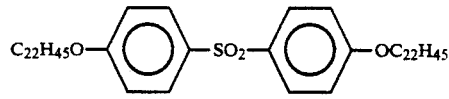

As a result, the pressure at the spinning nozzle reached 166 kgf/cm², the unstretched filament was white turbid, and fiber breaking occurred. No substantial effects were produced as compared with the present invention.

EXAMPLE 8

Polyester fiber was produced in the same manner as in Example 2, except for replacing Compound (II-1) with Compound (III-1). As a result, the pressure at the spinning nozzle was 121 kgf/cm², the unstretched filament had an intrinsic viscosity of 0.59, and the stretched filament had a fiber strength of 5.2 g/d.

EXAMPLE 9

Polyester fiber was produced in the same manner as in Example 2, except for replacing Compound (II-1) with Compound (III-5). As a result, the pressure at the spinning nozzle was 124 kgf/cm², the unstretched filament had an intrinsic viscosity of 0.59, and the stretched filament had a fiber strength of 5.1 g/d.

EXAMPLE 10

Polyester fiber was produced in the same manner as in Example 2, except for replacing Compound (II-1) with Compound (III-3). As a result, the pressure at the spinning nozzle was 125 kgf/cm², the unstretched filament had an intrinsic viscosity of 0.58, and the stretched filament had a fiber strength of 5.1 g/d.

EXAMPLE 11

Polyester fiber was produced in the same manner as in Example 2, except for replacing Compound (II-1) with 1.0 part of Compound (III-1). As a result, the pressure at the spinning nozzle was 159 kgf/cm², the unstretched filament had an intrinsic viscosity of 0.58, and the stretched filament had a fiber strength of 4.8 g/d.

EXAMPLE 12

Polyester fiber was produced in the same manner as in Example 2, except for replacing Compound (II-1) with 2.0 parts of Compound (III-1). As a result, the pressure at the spinning nozzle was 142 kgf/cm², the unstretched filament had an intrinsic viscosity of 0.59, and the stretched filament had a fiber strength of 4.8 g/d.

EXAMPLE 13

Polyester fiber was produced in the same manner as in Example 2, except for replacing Compound (II-1) with 10.0 parts of Compound (III-1). As a result, the pressure at the spinning nozzle was decreased to 109 kgf/cm², the unstretched filament had an intrinsic viscosity of 0.56, and the stretched filament had a fiber strength of 4.5 g/d.

COMPARATIVE EXAMPLE 5

Polyester fiber was produced in the same manner as in Example 2, except for replacing the melt viscosity depressant (II-1) with 5 parts of a compound of the formula:

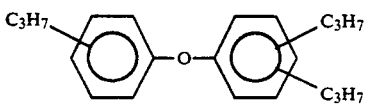

As a result, the pressure at the spinning nozzle was 142 kgf/cm$^2$. Vigorous fuming was observed in the vicinity of the spinning nozzle, and the unstretched filament was colored a little. The unstretched filament had an intrinsic viscosity of 0.52, and the stretched filament had a strength of 3.7 g/d, indicating significant reductions in resin molecular weight and fiber strength as compared with the present invention.

COMPARATIVE EXAMPLE 6

Polyester fiber was produced in the same manner as in Example 2, except for replacing the melt viscosity depressant (II-1) with 5 parts of a compound of the formula:

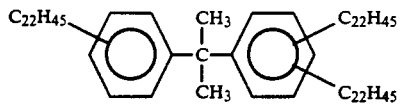

As a result, the pressure at the spinning nozzle reached kgf/cm$^2$, the unstretched filament was white turbid, and fiber breaking occurred. No substantial effects were produced as compared with the present invention.

EXAMPLE 14

Each of the filament yarns obtained in Examples 2 and 9 and Comparative Example 1 and a filament yarn made of general polyethylene terephthalate (PET) was dyed under the following conditions. Dyeing clarity was observed, and fastness to sublimation during storage was determined in accordance with JIS-L-0854 (90% RH×15 hrs.). The results obtained are shown in Table 2 below.

| Dyeing Condition: | |
| --- | --- |
| C.I. Blue 54 (Kayacryl Blue GSL-ED, produced by Nippon Kayaku Co., Ltd.) | 2% owf |
| Polyoxyalkylene fatty ester (Levenol TD-326, produced by Kao Co., Ltd.) | 0.15 g/l |
| Acetic acid | 1.0 g/l |
| Sodium sulfate | 5.0 g/l |
| Dyeing time | 120° C. × 45 min |
| Drying after soaping | 120° C. × 1 min |

TABLE 2

| | Example 2 | Example 9 | Compar. Example 1 | General PET |
| --- | --- | --- | --- | --- |
| Clarity | good | good | good | unclear |
| Fastness to sublimation during storage (70° C.) | grade 4 | grade 4 | grade 4 | grade 2 |

It can be seen that addition to a cationic dye-dyeable polyester resin of the melt viscosity depressants to be used in the present invention has no adverse influence on dyeability or fastness to sublimation of the polyester resin during storage.

While the invention has been described in detail and with reference to specific examples thereof, it will be apparent to one skilled in the art that various changes and modifications can be made therein without departing from the spirit and scope thereof.

What is claimed is:

1. A cationic dye-dyeable polyester resin composition comprising:
   (A) a cationic dye-dyeable polyester resin comprising (a) a bifunctional carboxylic acid component mainly comprised of terephthalic acid or an ester-forming derivative thereof, (b) an alkylene glycol or an ester-forming derivative thereof, and (c) 0.1 to 10 mol% based on the total amount of said polyester resin of a sulfonic acid salt represented by Formula (I):

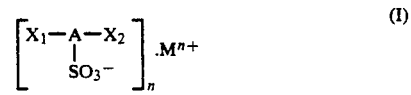

wherein A represents an aromatic or aliphatic group; $X_1$ represents an ester-forming functional group; $X_2$ represents a hydrogen atom or an ester-forming functional group which may be the same as or different from $X_1$; $M^{n+}$ represents an alkali metal cation, an alkaline earth metal cation, or an onium; and n represents 1 or 2; and
   (B) 0.5 to 10 parts by weight per 100 parts by weight of said polyester resin of at least one compound selected from the group consisting of
   a compound represented by Formula (II):

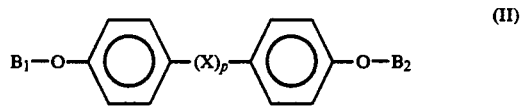

wherein $B_1$ and $B_2$ each represent an alkyl group or arylalkyl group having from 6 to 18 carbon atoms; X represents

—C—, —S—, —SO$_2$—, or —O—, wherein $R_1$ and $R_2$ each represent a hydrogen atom or an alkyl group having not more than 4 carbon atoms; and p represents 0 or 1,
   a compound represented by Formula (III):

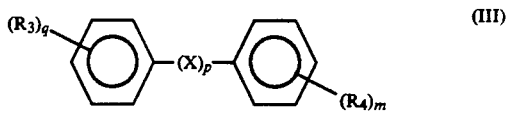

wherein X and p are as defined above; and $R_3$ and $R_4$ each represent an alkyl group; and q and m each represent 0 or an integer of from 1 to 4, with the sum of q and m ranging from 1 to 4; provided that the total carbon atom number of $(R_3)_q$ and $(R_4)_m$ is from 12 to 54.

2. A process for producing a cationic dye-dyeable polyester fiber comprising adding 0.5 to 10 parts by weight of at least one compound selected from the group consisting of a compound represented by Formula (II):

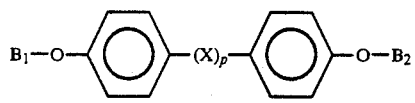
(II)

wherein $B_1$ and $B_2$ each represent an alkyl group or arylalkyl group having from 6 to 18 carbon atoms; X represents

—C—, —S—, —$SO_2$—, or —O—, wherein $R_1$ and $R_2$ each represent a hydrogen atom or an alkyl group having not more than 4 carbon atoms; and p represents 0 or 1,
a compound represented by Formula (III):

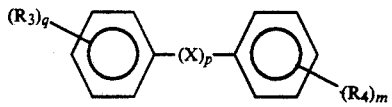
(III)

wherein X and p are as defined above; and $R_3$ and $R_4$ each represent an alkyl group; and q and m each represent 0 or an integer of from 1 to 4, with the sum of q and m ranging from 1 to 4; provided that the total carbon atom number of $(R_3)_q$ and $(R_4)_m$ is from 12 to 54, to 100 parts by weight of a cationic dye-dyeable polyester resin comprising (a) a bifunctional carboxylic acid component mainly comprised of terephthalic acid or an ester-forming derivative thereof, (b) an alkylene glycol or an ester-forming derivative thereof, and (c) 0.1 to 10 mol% based on the total amount of said polyester resins of a sulfonic acid salt represented by Formula (I):

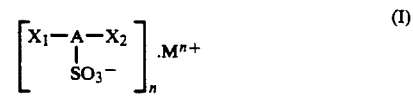
(I)

wherein A represents an aromatic or aliphatic group; $X_1$ represents an ester-forming functional group; $X_2$ represents a hydrogen atom or an ester-forming functional group which may be the same as or different from $X_1$; $M^{n+}$ represents an alkali metal cation, an alkaline earth metal cation, or an onium; and n represents 1 or 2, and melt-spinning the resulting cationic dye-dyeable polyester resin composition.

3. A cationic dye-dyeable polyester resin composition as in claim 1, wherein said cationic dye-dyeable polyester resin has an intrinsic viscosity $[\eta]$ of from 0.4 to 0.7 in a phenol/tetrachloroethane (60/40 by weight) solution at 25° C.

4. A colored polyester fiber dyed with a cationic dye, which comprises a cationic dye-dyeable polyester resin composition as in claim 1.

* * * * *